United States Patent [19]

Sekiya

[11] 4,262,844
[45] Apr. 21, 1981

[54] CONTROL VALVE
[75] Inventor: George W. Sekiya, Chicago, Ill.
[73] Assignee: Mark Controls Corporation, Evanston, Ill.
[21] Appl. No.: 114,312
[22] Filed: Jan. 22, 1980
[51] Int. Cl.³ .............................................. G05D 23/10
[52] U.S. Cl. .................................. 236/48 R; 236/93 B; 236/101 E; 239/75; 239/586; 138/45
[58] Field of Search ................. 236/48 R, 93 R, 93 B, 236/101 A, 101 E; 239/63, 75, 397.5, 553.3, 586; 138/45, 46

[56] References Cited
U.S. PATENT DOCUMENTS

| 2,271,850 | 2/1942 | Zinkil | 236/93 R |
|---|---|---|---|
| 2,501,185 | 3/1950 | Moorhead | 236/48 R X |
| 2,647,017 | 7/1953 | Coulliette | 299/144 |
| 2,698,022 | 12/1954 | Fahnoe | 137/79 |
| 2,777,303 | 1/1957 | Slattery | 62/140 |
| 3,081,034 | 3/1963 | Schumann | 236/93 B |
| 3,263,926 | 8/1966 | Couffer et al. | 236/93 B |
| 3,368,758 | 2/1968 | Fraser | 236/93 B |
| 3,401,881 | 9/1968 | Brouder | 236/101 E X |
| 3,450,342 | 6/1969 | Arledge, Jr. | 236/1 |
| 3,583,430 | 6/1971 | Toennesen | 137/468 |
| 3,659,783 | 5/1972 | Schwartz | 236/93 B |
| 3,938,741 | 2/1976 | Allison | 239/75 |
| 4,027,848 | 6/1977 | Mundil | 251/11 |

Primary Examiner—William E. Tapolcai, Jr.
Attorney, Agent, or Firm—Hume, Clement, Brinks, Willian & Olds, Ltd.

[57] ABSTRACT

A temperature-responsive valve for controlling the flow of fluid substantially without being affected by the pressure of or the turbulence generated by said fluid, comprises a housing having a chamber therein, an inlet port communicating with said outlet port communicating with said chamber, a temperature deflectable partition having an aperture and a tube. The tube extends from said inlet port past said aperture when the deflectable partition is in the position permitting a full flow of fluid. When the temperature of the fluid transmitted to said partition reaches a first predetermined value, the deflectable partition snaps to restrict with its surface the flow of fluid into said outlet port and remains in that position until the temperature of said fluid transmitted to said partition reaches a second predetermined value. The deflectable partition then snaps to permit the full flow of fluid into said outlet port. The tube substantially eliminates the effect of the pressure and the turbulence of the fluid upon temperature at which the deflectable partition snaps to restrict the flow of fluid. The temperature-responsive valve is especially useful in showers for protecting users from discomfort or scalding in the event the temperature of the shower water rises above the desired value.

16 Claims, 9 Drawing Figures

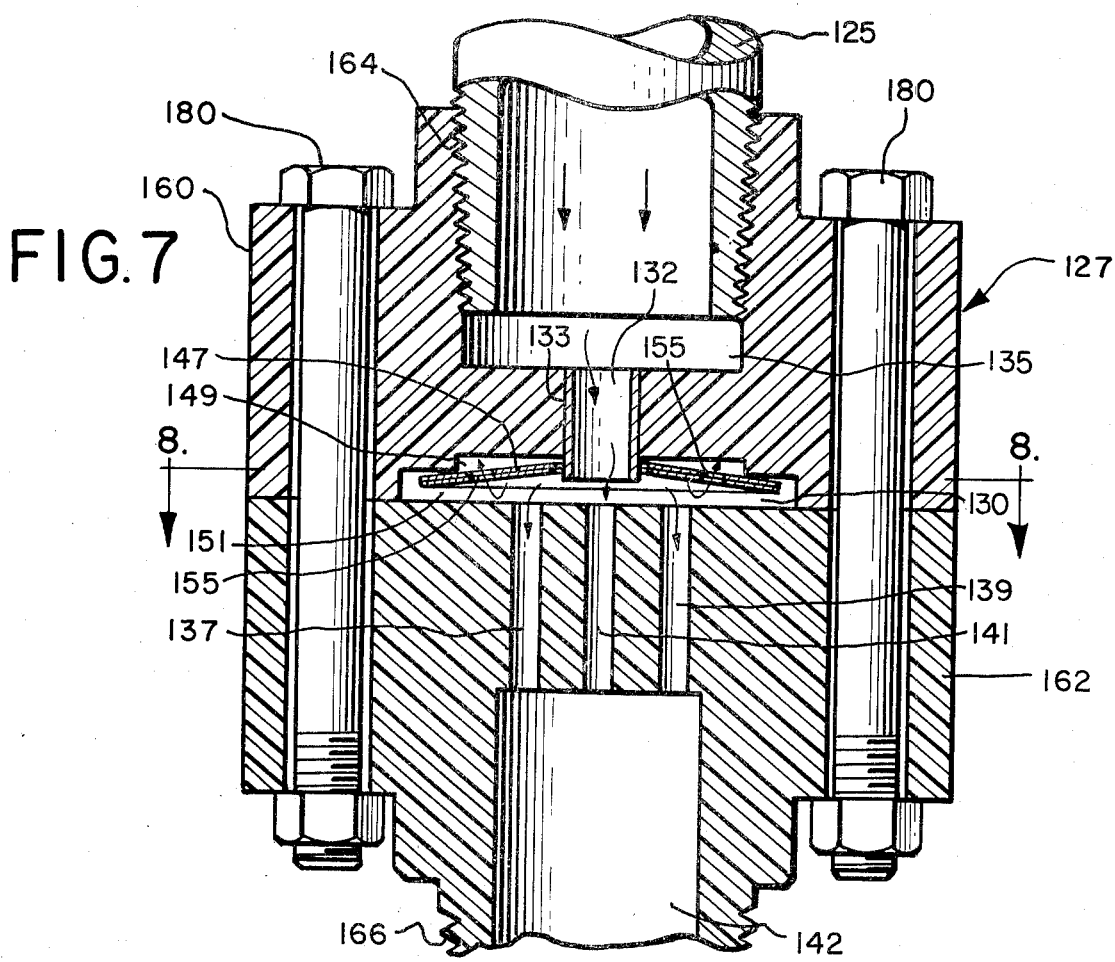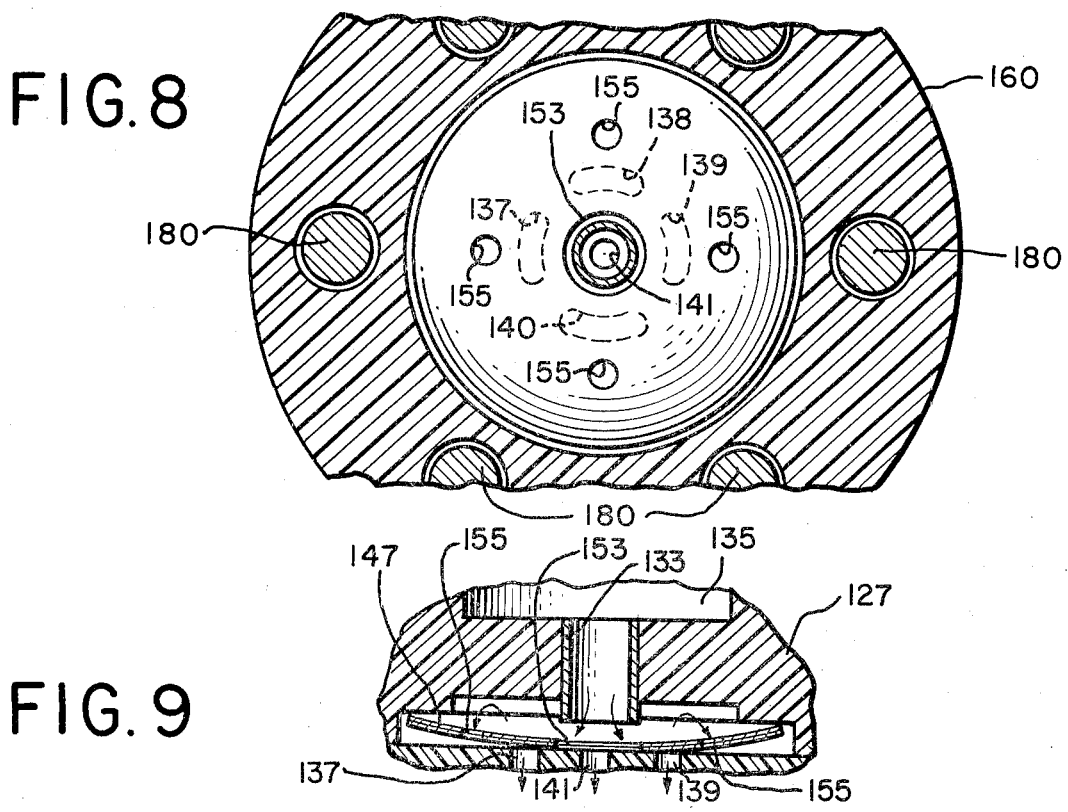

CONTROL VALVE

BACKGROUND OF THE INVENTION

This invention relates to control valves, and in particular, it relates to control valves for controlling the flow of fluid in response to the temperature of said fluid.

In many applications it is desirable or necessary to restrict the flow of fluid when the temperature thereof exceeds or falls below a certain predetermined value. For example, in a residential shower system it is advantageous to restrict the flow of water through the shower head to the point that water is no longer sprayed onto the person taking a shower whenever the temperature of the water entering the shower head becomes so hot as to cause discomfort, scalding or burning of the person taking the shower. The sudden increase of the water temperature can occur whenever the flow of cold but not hot water into the shower system is for any reason prevented or restricted. For example, a rapid discharge of cold water caused by flushing a toilet might cause the cold water pressure to drop momentarily thereby causing a sudden increase of the temperature of water sprayed from the shower head. Similarly, a malfunction in the water supply system or of the mixing valve can result in a sudden increase of the water temperature. The dangers of thermal shock in showers have been recognized by ASTM's committee on Consumer Product Safety which proposed safety specifications for thermal shock preventing devices (ASTM Committee F-15 on Consumer Product Safety Designation F-44).

A number of approaches have been proposed to alleviate the problem of thermal shock and to efficiently control the flow of fluid depending on the temperature of the fluid. None of them has been entirely satisfactory, generally because the systems are expensive, bulky, difficult to maintain and thus have a slow response time. A new approach to the problem is described in a pending patent application of Charles Priesmeyer entitled "Control Valve" (assigned to Mark Controls Corporation), Ser. No. 093,063.

The present invention provides an improved valve for controlling the flow of fluid depending on the temperature thereof, the performance of which valve is not significantly affected by the pressure of the fluid or fluctuations in said pressure. Thus, one object of the invention is to provide an improved control valve for restricting the flow of fluid, which valve contains a minimum number of moving parts, is easy to construct and install, and which operates accurately regardless of the pressure of the fluid or fluctuations in said pressure.

Another object of the invention is to provide a flow restricting valve which is highly reliable, accurate and inexpensive to construct, install and maintain.

A further object of the invention is to provide a control valve which rapidly and consistently responds to the temperature of the fluid passing therethrough and rapidly restricts the flow thereof at a predetermined temperature even when the pressure of the fluid changes or fluctuates.

Still another object of the invention is to provide a restricting valve which in restricted position responds rapidly to the change in the temperature of the incoming fluid and reopens the flow of fluid therethrough.

Other objects of the invention will become apparent to those skilled in the art upon studying this disclosure.

BRIEF DESCRIPTION OF THE DRAWINGS

FIG. 7 is a cross-sectional view of the control valve of FIG. 6 taken along lines 7—7 thereof, the valve being shown in a position permitting a full flow of fluid therethrough.

FIG. 8 is a cross-sectional view of the control valve of FIG. 7 taken along lines 8—8 thereof.

FIG. 9 is a partial cross-sectional view of the control valve of FIG. 7 in a position restricting the flow of fluid therethrough.

BRIEF DESCRIPTION OF THE INVENTION

A control valve for restricting or permitting a full flow of fluid depending on the temperature thereof includes a chamber which is subdivided into an inlet compartment communicating with a fluid inlet and an outlet compartment communicating with a fluid outlet. The two compartments are partitioned by a deflectable plate which has an aperture therethrough. A tube extends from said inlet past the aperture when the deflectable plate is in a position permitting a full flow of fluid. Whenever the temperature of the fluid flowing through the restricting valve is outside a predetermined acceptable range of temperatures, the plate deflects so as to partially restrict with its surface the flow of fluid out of said outlet compartment and remains in that position until the temperature of the fluid in said control valve returns to the acceptable level. The tube allows deflection of the plate substantially at the predetermined temperature regardless of the dynamic or the static pressure of the fluid.

DETAILED DESCRIPTION OF THE INVENTION

Surprisingly, it has been discovered that a tube which extends from the inlet into and past the aperture of a deflectable partition and has a diameter slightly smaller that that of the aperture makes the control valve substantially independent of the pressure of and turbulence generated by the fluid flowing therethrough. This permits an accurate control of the temperature at which the valve restricts the flow of fluid which is of great importance in a majority of applications.

Figure 1:
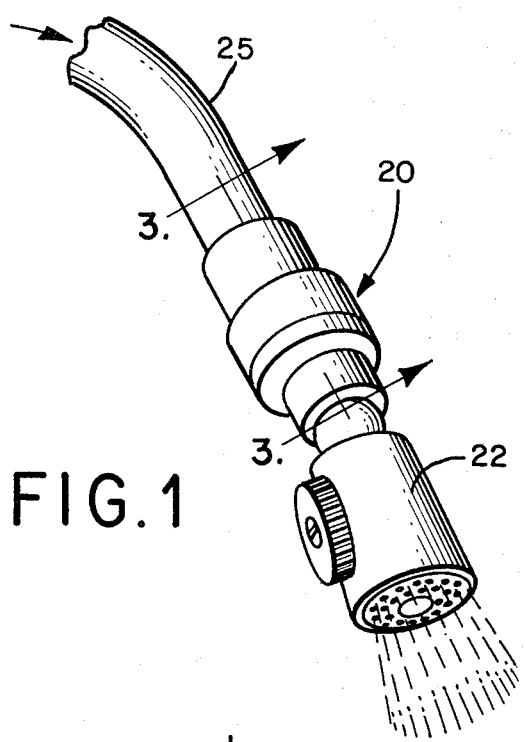
FIG. 1 is a perspective view of a shower head assembly that includes a control valve constructed in accordance with the present invention.
Figure 6:
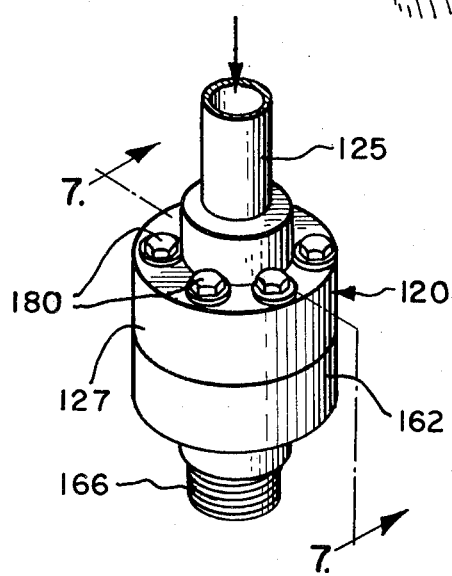
FIG. 6 is a perspective view of another embodiment of the control valve constructed in accordance with the present invention.

The control valve of the present invention and operation thereof will be described in detail in connection with two preferred embodiments depicted in the FIGURES. Referring now to FIG. 1, the control valve of the present invention is designated generally by a numeral 20. The control valve 20 is threaded at one end to a shower head 22 and at the other end to a water pipe 25.

Figure 2:
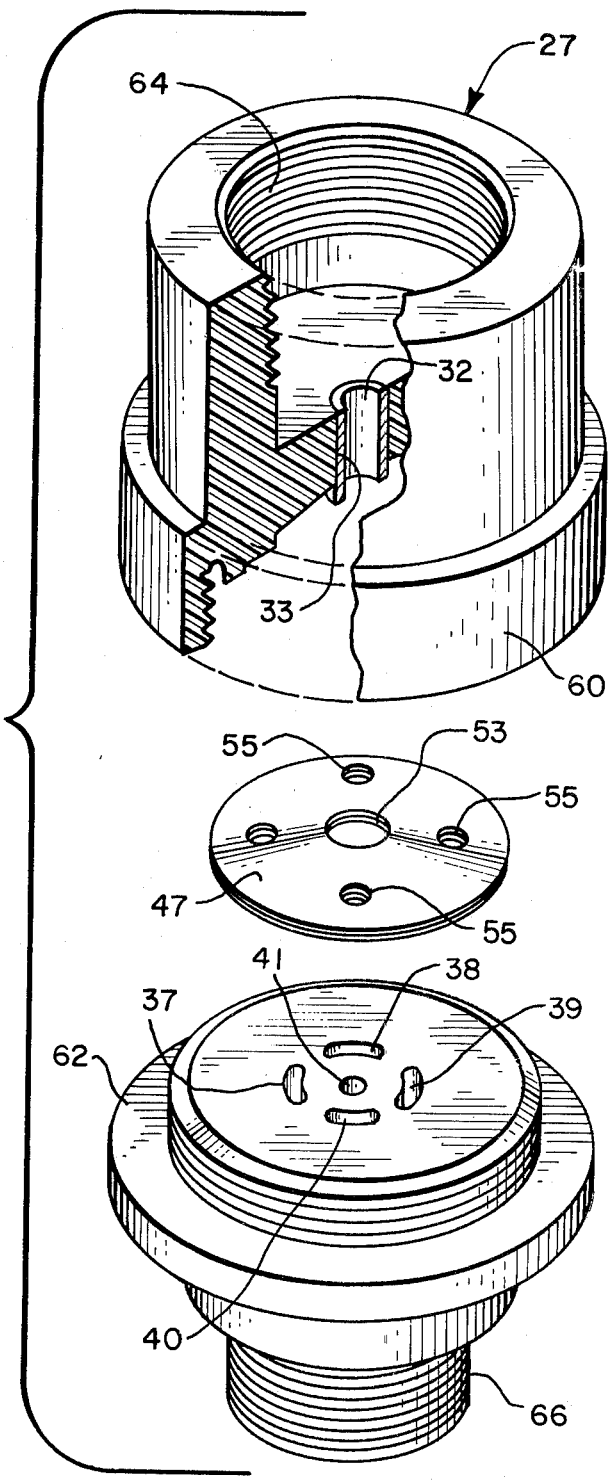
FIG. 2 is an exploded view of a control valve shown in FIG. 1.
Figure 3:
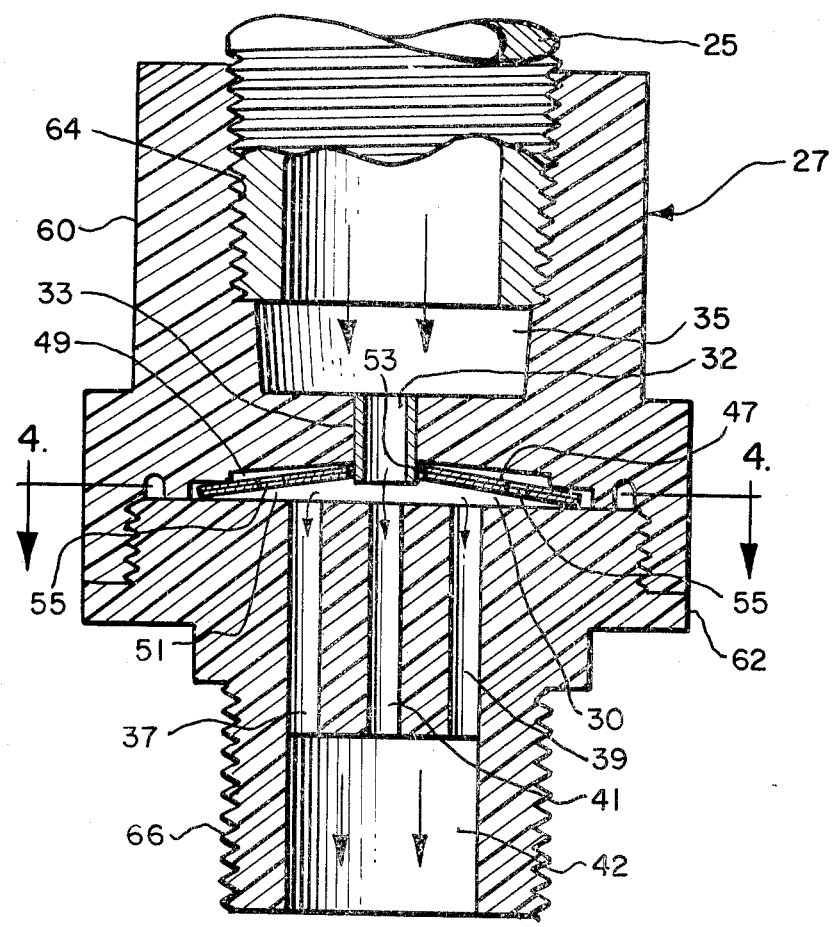
FIG. 3 is a cross-sectional view of the control valve of FIG. 1. taken along lines 3—3 thereof, the valve being shown in a position permitting full flow of fluid therethrough.
Figure 4:
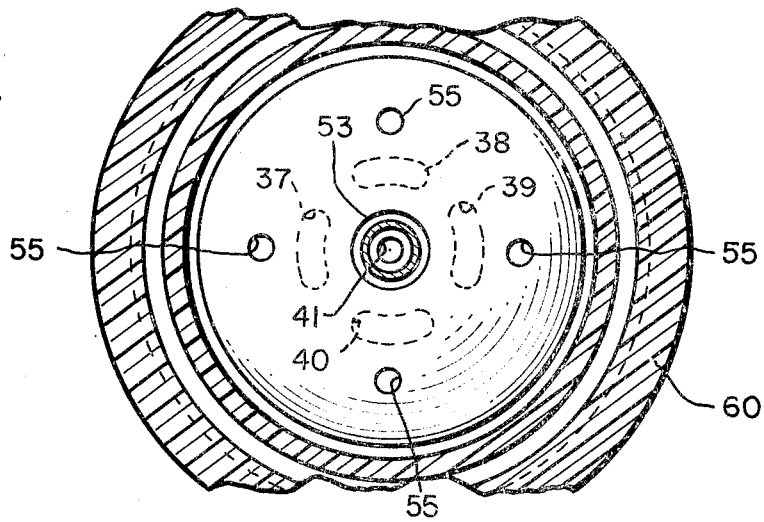
FIG. 4 is a cross-sectional view of the control valve of FIG. 3 taken along lines 4—4 thereof.
Figure 5:
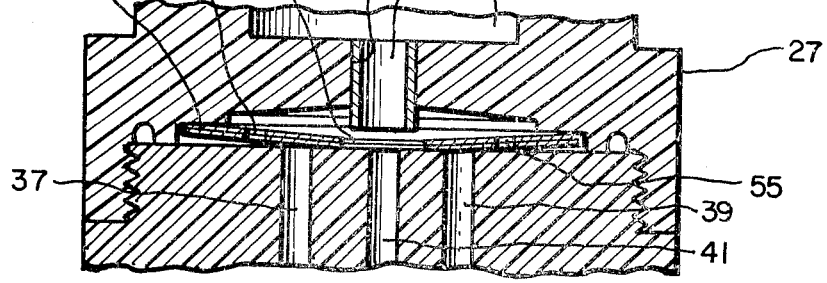
FIG. 5 is a partial cross-sectional view of the control valve as shown in FIG. 3 in position restricting the flow of fluid.

As shown in FIGS. 2 and 3, the control valve 20 includes a housing 27 which defines a chamber 30. The chamber 30 communicates through an inlet port 32 which is defined by a tube 33 with an inlet cavity 35 which in turn communicates with the interior of the water pipe 25. The water pipe 25 is threaded to the housing 27. As shown in FIGS. 3-5, on the side opposite from the inlet port 32, there are defined in the housing 27 outlet ports 37, 38, 39, 40 and 41 which provide a communication between the chamber 30 and an outlet cavity 42. The outlet cavity 42 in turn communicates with the interior of the shower head 22 threaded to the housing 27. A partition 47 inside the chamber 30 subdivides said chamber 30 into an inflow section (compartment) 49 and an outlet section (compartment) 51. As shown in FIG. 2, the partition 47 has a concave-convex shape and a substantially uniform thickness. In the preferred embodiment the partition is bimetallic, i.e., the upper surface thereof composed of a metal having a different temperature coefficient of expansion than that of the lower surface, and it has a flexivity of $110 \times 10^{-7}$ as tested using American Society of Testing Materials test No. B106 (ASTM B106). The bimetal can be commercially purchased from Hood & Co. in Hamburg, Pennsylvania and is designated as No. 1521 alloy. Accordingly, as the temperature of the partition 47 reaches a predetermined level, the partition 47 "snaps" (deflects) into a position where the surface that was concave becomes convex and the surface that was convex becomes concave.

The partition 47 has an aperture 53 through the center thereof and a plurality of holes 55 spaced around said aperture 53. As shown in FIG. 3, the partition 47 is positioned in the chamber 30 so that the aperture 53 is aligned with the inlet port 32 and so that the tube 33 extends into and slightly past the aperture 53. When the partition 47 is in the position shown in FIG. 3, the convex surface is in contact with portions of the wall of the chamber 30 around the tube 33. The surface of the partition 47 is in contact with the walls of the chamber 30 so as to prevent the flow of fluid around the partition 47. Thus, the outlet section 51 communicates with the inlet port 32 substantially only through the aperture 53. The holes 55 provide a communication between the inlet section 49 and the outlet section 51. The holes 55 are offset with respect to the partition 47 when said partition 47 is in a position where the surface thereof closest to the inlet port 32 is concave. In that position, as shown in FIG. 5, the convex surface of said partition 47 restricts outlet ports 37, 38, 39 and 40.

The control valve 20 is easy and inexpensive to manufacture and assemble. As shown in FIGS. 2-5, the housing 27 of the control valve 20 includes two sections 60 and 62 which can be easily and inexpensively molded from plastic and a tube 33 which is preferably metallic but which can be made from other non-corrosive materials. To assemble the control valve 20, the partition 47 is placed in position either in section 60 or 62 and the two sections 60 and 62 are then either threaded or welded together. The valve 20 is also easy to install in either new shower units or in the existing shower units. The threaded portion 64 of section 60 is threaded to the shower pipe 25 and the shower head 22 is then threaded to the threaded portion 66 of section 62.

In operation, the partition 47 is normally in a position permitting a full flow of fluid through the valve 20 as shown in FIG. 3. The user of the shower selects the water temperature by adjusting the mixing valve (not shown) and turns the water on. The water then flows through the water pipe 25 into the inlet cavity 35 and from the inlet cavity 35 through the inlet port 32 into the chamber 30. It has been discovered that the tube 33 makes the operation of the control valve independent of the pressure and pressure fluctuations of the water passing therethrough. It is believed that the improved operation of the valve is the result of elimination of turbulence which would have been exerted on the upper surface of the partition 47. Some of the water entering the chamber 30 passes through holes 55 of partition 47 into section 49. This assures that the incoming water is in contact with both sides of the partition 47 and provides a large area for heat transfer from the incoming water to the partition 47. The holes 55 also provide for equalization of the water pressure on both sides of the partition 47 so as to prevent pressure build up in outlet section 51 from impeding the flexing action of the disc at a predetermined temperature. Since the bimetallic partition 47 is a good conductor of heat, and since the area of contact between the water in chamber 30 and the partition 47 is large in comparison to the volume of said partition, any change of the temperature of incoming water is rapidly transmitted to the partition 47. As long as the temperature of the water in chamber 30 is below a first predetermined temperature (for example, 115° F.), the partition 47 remains in the position shown in FIG. 3. The water from chamber 30 flows through outlet ports 37, 38, 39, 40 and 41 and through outlet cavity 42 into the shower head 22 from which it is sprayed onto the user of the shower.

As the temperature of the water flowing into chamber 30 increases to a first predetermined level, heat is rapidly transferred to the partition 47 whose temperature rapidly reaches the temperature of the water and "snaps" (deflects) to a position in which the concave surface thereof becomes convex and vice versa. It has been discovered that the tube 33 allows the partition 47 to snap at practically the same temperature regardless of the pressure and turbulence generated by the inflowing water. This advantage is of great importance in those applications where it is important that the flow of water is restricted, regardless of the operating conditions, within close tolerance limit to the predetermined level. It should be emphasized that the control valve constructed in accordance with the present invention restricts the flow of water through the shower head in less than five seconds from the time water having a temperature above the first predetermined value first enters the control valve 20. In the position shown in FIG. 5, the convex surface of the partition 47 restricts the outlet ports 37, 38, 39 and 40. The water is permitted to flow out in an unrestricted manner of the chamber 30 only through the outlet port 41, but the total flow rate out into shower head 22 is not sufficient to permit spraying of the water from the shower head 22. The water trickles down from the shower head 22, which permits inflow of water from pipe 25 and assures that when the temperature of the inflowing water falls to a second predetermined temperature (e.g. 85° F.), that the heat is transmitted from the partition 47 to the water in chamber 30 and as the partition 47 reaches the second predetermined temperature the partition 47 "snaps" (deflects) to the normal position permitting a full flow of water through said valve. When the control valve of the present invention is used in showers, the partition 47 is chosen generally so that the first predetermined temperature is in the range from about 115° to about 120° F. and the second predetermined temperature is in the range from about 85° to about 95° F. Of course, the second predetermined temperature may be higher, lower or approximately the same as the first predetermined temperature, depending on the choice of materials for partition 47, and the particular application of the control valve.

Another embodiment of the present invention is depicted in FIGS. 6-9, inclusive. The only significant difference between this embodiment and the one shown in FIGS. 2-5 (the first embodiment) inclusive, is the construction of the housing. Accordingly, the parts of the control valve 120 depicted in FIGS. 6-9, inclusive, corresponding to the parts of the first embodiment are designated by numerals which are the same as those of the first embodiment except they are preceded by a digit 1. For example, the chamber in the second embodiment corresponding to chamber 30 is designated by the numeral 130. The sections 160 and 162 are held together by bolts 180.

The embodiments described above and depicted in the FIGURES are provided for illustrative purposes and are not intended to limit the scope of the invention in any manner. For example, although the partition in the embodiments described above is bimetallic, the invention is not restricted to bimetallic partition and any partition which deflects at a predetermined temperature in the manner described in this disclosure can be used in the valve constructed in accordance with this invention. It should also be noted that the temperatures at which a partition deflects is a predetermined characteristic of that partition and it is predetermined prior to the assembly of the control valve. The choice of the partition to deflect at a particular temperature depends on the application and can vary even within a particular application. For example, when the control valve of the present invention is used in showers as in the embodiments described above, the partition should deflect to restrict the flow of fluid through the valve at a temperature at which the water becomes uncomfortably hot to the user. This temperature, of course, can vary depending on the user, but the temperature at which the valve is restricted is generally in the range from 115°-120° F. The specific partition selected for a particular use can readily be replaced with a partition deflecting at a different temperature which is another important advantage of this invention. In some applications it may be advantageous to install the control valve constructed in accordance with the present invention inside a shower head.

It should also be noted that the valve can also be used to restrict the flow when the temperature of the fluid passing therethrough falls below rather than above a predetermined value. In that case, the valve prevents flow of fluid which is too cold rather than too warm. It should also be noted that the tube described in the preferred embodiment can be an integral part of the inlet. The important feature of the invention is that tube should extend into said aperture sufficiently far and have a sufficiently large diameter to make the partition of the valve snap to restrict the flow at substantially the same predetermined temperature regardless of the pressure of fluid flowing therethrough and regardless of the fluctuations of that pressure. All such changes and modifications that fall within the spirit of this invention defined the appended claims are intended to be included within its scope.

I claim:

1. A temperature-responsive valve for controlling the flow of a fluid through said valve comprising:
   a housing;
   a chamber in said housing;
   an inlet port communicating with said chamber;
   at least one outlet port communicating with said chamber;
   a temperature-deflectable partition having an aperture therethrough and having a surface, said partition subdividing said chamber into an inflow section containing said inlet port and an outlet section containing said outlet port, said inlet section and said outlet section communicating substantially only through said aperture, said aperture being offset with respect to at least one outlet port, said partition deflecting, when its temperature substantially reaches a first predetermined value, such that said surface itself restricts the flow of fluid into at least one outlet port and said partition deflecting when its temperature substantially reaches a second predetermined value to position said surface away from said outlet port thus permitting an unrestricted flow of said fluid into said outlet port; and,
   a tube extending into and past said aperture when said partition is away from said outlet port, said tube making said valve substantially independent of the pressure of and turbulence generated by said fluid.

2. A valve as claimed in claim 1 wherein said partition has a substantially uniform thickness.

3. A valve as claimed in claim 1 wherein said partition is a bimetallic plate.

4. A valve as claimed in claim 1 wherein said fluid is a liquid.

5. A valve as claimed in claim 4 wherein:
   said chamber is cylindrical in shape;
   said partition is a concave-convex circular plate;
   said aperture is in the center of said partition; and
   said inlet port is aligned with said aperture.

6. A valve as claimed in claim 5 wherein said partition has a plurality of holes therethrough to permit said fluid to pass therethrough and accelerate heat transfer from said fluid to said partition and to equalize fluid pressures on either side of said partition.

7. A valve as claimed in claim 6 wherein at least one of said outlet ports is not fully restricted so as to permit said fluid to drain into said outlet port when said partition is in a position restricting the flow of fluid assuring that the temperature transmitted to said partition approximates the temperature of the incoming fluid.

8. A valve as claimed in claim 1 wherein the partition is in a position permitting an unrestricted flow of fluid into said outlet port when the temperature of said partition is below a first predetermined value.

9. A valve as claimed in claim 8 wherein the first predetermined value is in the range from about 115° to about 120° F.

10. A valve as claimed in claim 1 wherein the second predetermined value is from about 85° to about 95° F.

11. A valve as claimed in claim 1 wherein the partition is in a position permitting an unrestricted flow of fluid into said outlet port when the temperature of said partition is below the first predetermined value.

12. A valve as claimed in claim 1 wherein said valve is located inside the shower head.

13. In a shower valve of the type including a housing; a chamber in said housing; an inlet port communicating with said chamber; at least one outlet port communicating with said chamber; a bimetallic concave-convex circular plate having an aperture therethrough and having a surface, said plate subdividing said chamber into an inlet section containing said inlet port and an outlet section containing said outlet port, said inlet section and said outlet section communicating substantially only through said aperture, said aperture being offset with respect to at least one outlet port, said plate snapping when its temperature substantially reaches a first predetermined value to a restricting position in which the surface thereof restricts the flow of water into said outlet port and snapping into open position when its temperature substantially reaches a second predetermined value to permit the flow of said water into said outlet port, the improvement comprising:

tube means extending from said inlet port into said aperture, said tube means being provided to permit snapping of said plate to occur within small tolerance limits of the first and the second predetermined values despite changes in the pressure of and turbulence generated by fluid passing through said valve.

14. A valve as claimed in claim 13 wherein the first predetermined value is between about 115° and about 120° F. and wherein the second predetermined value is between about 85° and 95° F.

15. A valve as claimed in claim 13 wherein the plate snaps to the restricting position within five seconds from the time the water having temperature above the first predetermined value enters the chamber.

16. A kit for a valve for interrupting the flow of water into a shower head when the temperature of water exceeds a predetermined value, said kit comprising:

a female member comprising a cylindrical chamber open at one end, having a threaded lateral wall and an end wall with an inlet port through the center thereof;

a cylindrical member having a threaded lateral surface, and an end wall and at least one outlet port through said end surface, said outlet port being away from the center of said end surface;

a concave-convex circular plate having an aperture through the center thereof, said plate adapted to fit in said chamber so that said aperture is substantially coaxial with said port and to subdivide said chamber into an inlet section including the inlet port and an outlet section including an outlet port, said female member being adapted for threading into said cylindrical member so that said end surface closes said chamber, said plate adapted to snap into a restricting position when its temperature substantially reaches a first predetermined value and to snap into an open position when its temperature substantially reaches a second predetermined value; and, a tube for placement in said inlet port so that it extends into said aperture, said tube assuring that said plate deflects substantially at predetermined temperatures regardless of the pressure changes of and turbulence generated by water passing through said valve.

* * * * *

UNITED STATES PATENT AND TRADEMARK OFFICE
CERTIFICATE OF CORRECTION

PATENT NO. : 4,262,844
DATED : April 21, 1981
INVENTOR(S) : George W. Sekiya

It is certified that error appears in the above—identified patent and that said Letters Patent is hereby corrected as shown below:

Column 6, line 1, insert -- in -- after "defined".

Signed and Sealed this

Fifteenth Day of September 1981

[SEAL]

*Attest:*

*Attesting Officer*

GERALD J. MOSSINGHOFF

*Commissioner of Patents and Trademarks*